US008948939B2

(12) United States Patent
Putz et al.

(10) Patent No.: US 8,948,939 B2
(45) Date of Patent: Feb. 3, 2015

(54) NAVIGATION ASSISTANCE METHOD FOR MONITORING NAVIGATION PERFORMANCE IN LINEAR OR ANGULAR MODE

(71) Applicant: Thales, Neuilly-sur-Seine (FR)

(72) Inventors: Guilhem Putz, Toulouse (FR);
Christophe Caillaud, Blagnac (FR);
Francois Coulmeau, Seilh (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/797,485

(22) Filed: Mar. 12, 2013

(65) Prior Publication Data

US 2013/0245861 A1    Sep. 19, 2013

(30) Foreign Application Priority Data

Mar. 13, 2012    (FR) ...................................... 12 00755

(51) Int. Cl.
G06F 19/00    (2011.01)
G08G 5/00    (2006.01)
G01C 23/00    (2006.01)
G05D 1/06    (2006.01)
G05D 1/10    (2006.01)
G08G 5/02    (2006.01)
G05D 1/02    (2006.01)

(52) U.S. Cl.
CPC .............. G01C 23/00 (2013.01); G05D 1/0676 (2013.01); G05D 1/101 (2013.01); G08G 5/0021 (2013.01); G08G 5/025 (2013.01); G05D 1/0202 (2013.01)
USPC ........................................... 701/18; 340/945

(58) Field of Classification Search
USPC .............................................. 701/18; 340/945
See application file for complete search history.

(56) References Cited

U.S. PATENT DOCUMENTS

| 3,327,973 | A | * | 6/1967 | Kramer et al. ................ 244/186 |
| 3,946,387 | A | * | 3/1976 | Drucker ........................ 342/414 |
| 4,170,767 | A | * | 10/1979 | Tanner ......................... 340/955 |
| 5,745,863 | A | | 4/1998 | Uhlenhop et al. |
| 7,747,360 | B2 | * | 6/2010 | Canu-Chiesa et al. ............ 701/3 |
| 8,630,756 | B2 | * | 1/2014 | Fleiger-Holmes et al. ..... 701/16 |
| 2002/0099528 | A1 | | 7/2002 | Hett |
| 2004/0189492 | A1 | | 9/2004 | Selk, II et al. |
| 2007/0106433 | A1 | | 5/2007 | He |
| 2007/0145183 | A1 | | 6/2007 | Baudry |
| 2008/0140270 | A1 | | 6/2008 | Davis et al. |
| 2009/0024261 | A1 | | 1/2009 | Rouquette et al. |

FOREIGN PATENT DOCUMENTS

| EP | 1016851 | A1 | 7/2000 |
| EP | 1273987 | A2 | 1/2003 |

* cited by examiner

*Primary Examiner* — Thomas G Black
*Assistant Examiner* — Tyler Paige
(74) *Attorney, Agent, or Firm* — Baker Hostetler LLP

(57) ABSTRACT

A method for assisting in the navigation of an aircraft comprises steps of calculating and displaying a linear deviation on a first linear section and an angular deviation on a second angular section. The method comprises a calculation step for converting an angular deviation into an equivalent linear deviation, and, conversely, converting a linear deviation into an equivalent angular deviation. The method comprises a step of graphic representation, called unified monitoring, intended for the crew, of a deviation of the aircraft, on a lateral deviation axis and a vertical deviation axis; each of the deviations, lateral and vertical, being able to be represented on a linear scale, an angular scale or a mixed scale.

9 Claims, 6 Drawing Sheets

NAVIGATION ASSISTANCE METHOD FOR MONITORING NAVIGATION PERFORMANCE IN LINEAR OR ANGULAR MODE

CROSS-REFERENCE TO RELATED APPLICATION

This application claims priority to foreign French patent application No. FR 1200755, filed on Mar. 13, 2012, the disclosure of which is incorporated by reference in its entirety.

FIELD OF THE INVENTION

The invention relates to a method for assisting in the navigation of an aircraft 9, making it possible to optimize the following of a target trajectory, and more particularly a method intended to optimize the manoeuvres of the aeroplane in an approach phase to the runway of the arrival airport.

An ongoing increase in air traffic and in the resulting workload for the pilot has been observed for some years. The number of tasks to be carried out on board is increasing. The decision time is becoming shorter and shorter whereas meanwhile there is a general trend towards reducing the number of crew members. Automated procedures, making it possible to a certain extent to release the crew from routine tasks, are becoming increasingly widely used.

The monitoring of the approach procedures of an aircraft towards the runway of the arrival airport represents a particular issue in the aeronautic field. This flight phase is critical: although very short, it represents a predominant proportion of the accidents with loss of the craft. Having to take into account increasingly stringent environmental constraints, seeking for example to reduce pollution or sound nuisance, is making the approach procedure increasingly complex and difficult. Efforts are being made for example to minimize the distances reserved for take-off and landing, or efforts are being made to pass over determined areas with high accuracy, minimizing the nuisances and their dispersions. Another object of the new approach procedures is to increase the rate of take-offs and landings to make it possible to improve the capacity of the runways or navigate with very strict positioning constraints in the case of relief close to the runways.

BACKGROUND

Various systems exist for assisting a crew in the piloting of an aircraft, notably during an approach phase. Particularly well known among these systems are the flight management systems, called FMS, schematically represented in FIG. 1 and comprising the following functions:

- location LOCNAV, identified 1: making it possible to locate the aircraft by means of various geolocation tools or instruments (GPS, GALILEO, VHF radio beacons, inertial units),
- flight plan FPLN, identified 2: making it possible to input the geographic elements forming the skeleton of the route to be followed (departure and arrival procedures, way points, etc.),
- navigation database NAVDB 3: making it possible to construct geographic routes and procedures from data included in the bases (points, beacons, interception or altitude legs, etc.),
- performance database PRF DB 4: containing the aerodynamic and engine parameters of the craft,
- lateral trajectory TRAJ 5: making it possible to construct a continuous trajectory from points in the flight plan, observing the aeroplane performance levels and the containment constraints,
- predictions PRED 6: making it possible to construct an optimized vertical profile compatible with the lateral trajectory,
- guidance GUIDANCE 7: making it possible to guide, in the lateral and vertical planes, the aircraft on its 3D trajectory, while optimizing the speed,
- digital data link DATALINK 8: making it possible to communicate with the control centres, the airlines and the other aircraft.

In a typical approach phase as represented in FIGS. 2a, 2b and 2c, an aircraft 9 seeks to follow a target trajectory 10 to reach a landing runway 11. Generally, an approach phase comprises a first part consisting of one or more "linear" sections 12 followed by a final "angular" section 13 converging towards a touchdown point 14, generally situated close to the runway threshold 11. The final angular section 13 is possibly followed by one or more linear sections 12 in the case of a go-around phase for an interrupted approach, also referred to as "Missed Approach". On a linear section 12 as represented in FIG. 2b, a linear deviation 15 represents the distance separating an estimated position 16 of the aircraft 9 and a desired position 17 on the target trajectory 10. The linear deviation 15 can be expressed by a lateral component and a vertical component.

On an angular section 13 as represented in FIG. 2c, an angular deviation 18 represents the angle formed at the touchdown point 14, between the target trajectory 10 and a straight line D1 joining the touchdown point 14 to the estimated position 16 of the aircraft 9. The angular deviation 18 can be expressed by a lateral component and a vertical component.

In the known systems, the aim is to minimize the linear deviation on a linear section. Along a linear section produced with a navigation performance requirement, or RNP, standing for "Required Navigation Performance", the requirement is to keep the linear deviation 15 below a limit value. When the difference exceeds the limit value, the system provides for alerting the crew to enable it to decide on the corrective measures to be performed.

Along a linear section, the known systems propose to the crew, by means of a human-machine interface, or HMI, graphic representation means, commonly called "monitoring" means, that make it possible to monitor the navigation performance. In particular, the known systems propose a monitoring of the navigation performance on a linear section conforming to a current standardization, in particular the standard ICAO PBN Manual, doc 9613.

According to this standardization, a linear deviation 15 is graphically represented, as schematically represented in FIG. 3, on a first lateral deviation axis 21 and a second vertical deviation axis 22. This is called linear monitoring 20, the representation of a linear deviation 15, expressed laterally 23 and vertically 24, on the two deviation axes 21 and 22. The linear deviation 15 is represented on the lateral deviation axis 21 according to a lateral scale 25, called RNP, and on the vertical deviation axis 22 according to a vertical scale 26, called V-RNP, by means of a cross 27 symbolically representing the aircraft 9.

According to this standardization, when the aircraft 9 is positioned on the target trajectory 10, it appears centred on each of the scales, lateral 25 and vertical 26; a deviation thus being able to be positive or negative for each of the deviation axes 21 and 22. The equivalent distance between two RNP or V-RNP graduations is variable, for example according to the approach phases, the linear sections, the flight conditions or the aircraft type. Typically, in a navigation performed with a required navigation performance RNP, an alert will be transmitted to the crew when a linear deviation greater than 2 RNP graduations occurs.

As an example, in an approach phase, a monitoring of the navigation performance of "RNP 0.3" type may be required. The distance between two RNP graduations is then equal to 0.3 nautical miles, and the lateral linear deviation should be centred on the trajectory with a maximum tolerance of plus or minus 1 nautical mile, corresponding to plus or minus 2 RNP, a threshold from which an alert is transmitted to the crew. It will be recalled that a nautical mile, also called NM, is a unit commonly used by the person skilled in the art in the aeronautical field, 1 nautical mile corresponding to 1852 meters. The International Civil Aviation Organization (ICAO) defines standards at international level; in particular, the RNP values of 4 NM, 1 NM, 0.3 NM or 0.1 NM are the reference values used worldwide. The principle of the navigation assistance method according to the invention applies however to any RNP value.

On the final "angular" section, the aim is to minimize the angular deviation 18. In the known systems, a transmitting beacon arranged in proximity to the threshold of the landing runway 11 embodies the touchdown point 14. The reception by the aircraft 9 of the signal transmitted by the beacon then makes it possible to determine the angular deviation 18 of the aircraft 9 relative to its target trajectory 10. Thus, the expression ILS (Instrument Landing System) navigation applies, for an approach performed on an angular section in which the aim is to minimize the angular deviation 18. The navigation assistance method applies also to other types of angular approaches, such as, for example, the MLS (Microwave Landing System) approaches which rely on a wireless transmitting beacon, or, for example, the FLS (FMS Landing System) approaches which rely on a virtual beacon.

In the systems currently implemented, nothing is defined to guarantee the maintenance of navigation performance on an angular section. The systems do not propose any sophisticated monitoring tool to enable the crew to control the descent along an angular section, and have sufficient reaction time to manoeuvre the aircraft, in particular as the approach continues and the cone of the deviations shrinks.

Moreover, the switchover between the two types of navigation, from linear to angular (and from angular to linear in the case of an interrupted approach), is performed with no particular management of the transition. It is possible to ensure the monitoring of the navigation performance on the linear section, then when the aircraft 9 enters into the angular section, the linear monitoring is interrupted, the crew observes the angular deviation and decides on the corrective measures to be applied, without the possibility of anticipation at the time of the transition.

SUMMARY OF THE INVENTION

The invention aims to propose a navigation assistance method for an aircraft 9 in the approach phase that mitigates the implementation difficulties cited above. The method seeks in particular to propose a so-called unified monitoring tool, enabling the crew to monitor navigation performance without discontinuity between the linear or angular sections.

To this end, the subject of the invention is a method for assisting in the navigation of an aircraft comprising steps for calculating and displaying:
  a linear deviation, for the aircraft in approach phase towards an arrival airport on a first section, called linear section; the linear deviation representing a distance separating an estimated position of the aircraft and a desired position on a target trajectory; the linear deviation being able to be expressed by a lateral component and a vertical component,
  an angular deviation, for the aircraft in approach phase towards an arrival airport on a second section, called angular section; the angular deviation representing an angle formed at a touchdown point situated in proximity to the landing runway threshold, between the target trajectory and a straight line joining the touchdown point to the estimated position of the aircraft; the angular deviation being able to be expressed by a lateral component and a vertical component,
characterized in that the method comprises the following steps:
  a conversion of an angular deviation into an equivalent linear deviation, or, conversely, the conversion of a linear deviation into an equivalent angular deviation,
  a graphic representation, intended for the crew, of a deviation of the aircraft, of which each of the components, lateral and vertical, can be represented linearly or angularly, with no discontinuity between the linear section and the angular section.

According to the invention, the navigation assistance method makes it possible to monitor, throughout the approach phase, navigation performance, by means of a deviation that can be represented independently on a linear or angular scale.

BRIEF DESCRIPTION OF THE DRAWINGS

The invention will be better understood, and other advantages will become apparent, on reading the detailed description of the embodiments given as examples in the following figures.

In the interests of clarity, the same elements will be given the same references in the different figures.

DETAILED DESCRIPTION

Figure 1:
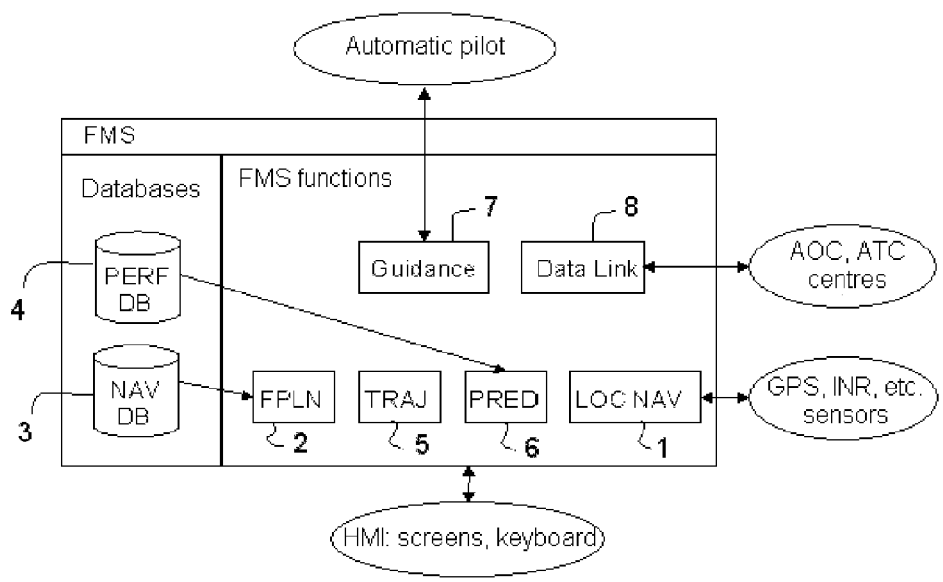
FIG. 1, already presented, represents a known navigation assistance system, commonly called FMS, FIGS. 2*a*, 2*b* and 2*c*, already presented, represent an approach phase made up of a number of linear sections and one angular section, FIG. 3, already presented, represents means for graphically representing, or monitoring, a linear deviation, laterally and vertically.
Figure 2A:
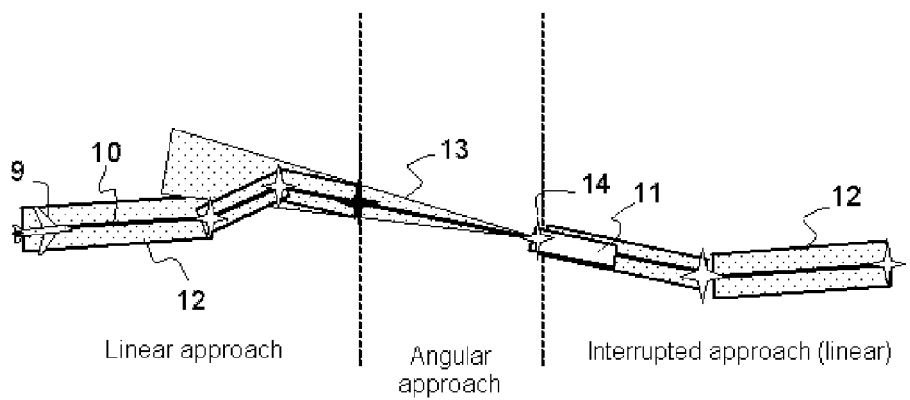
Figure 2B:
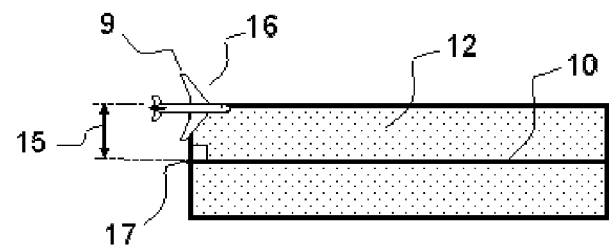
Figure 2C:
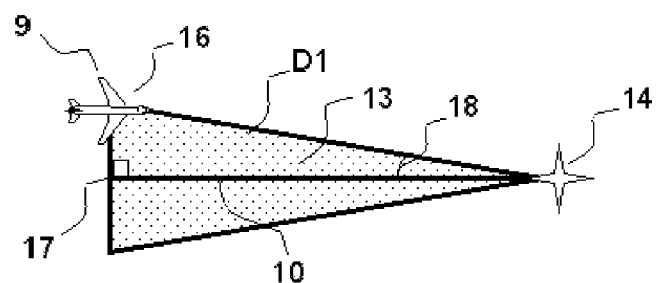
Figure 3:
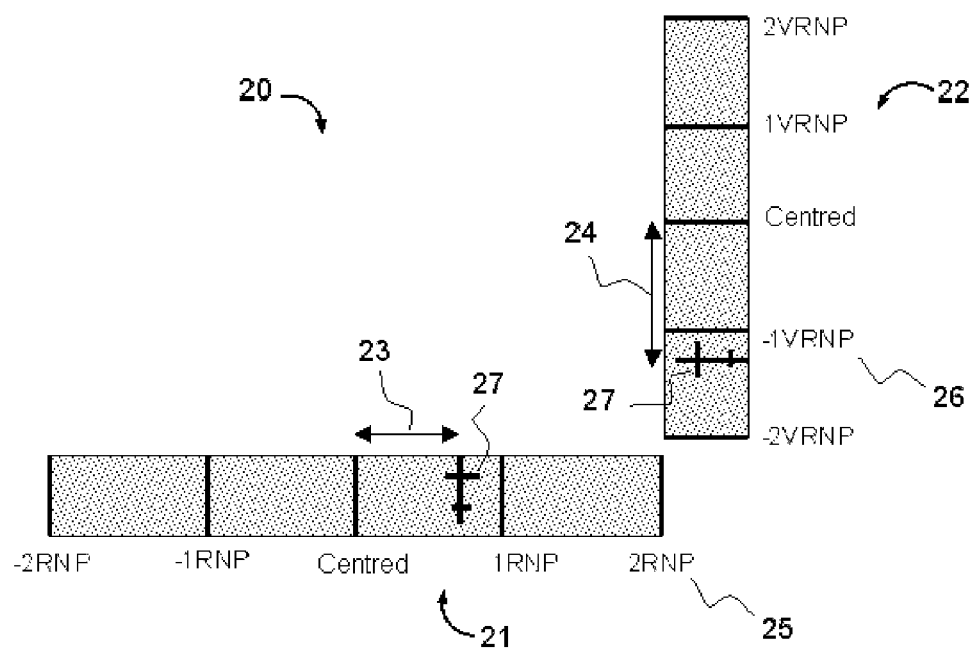
Figure 4:
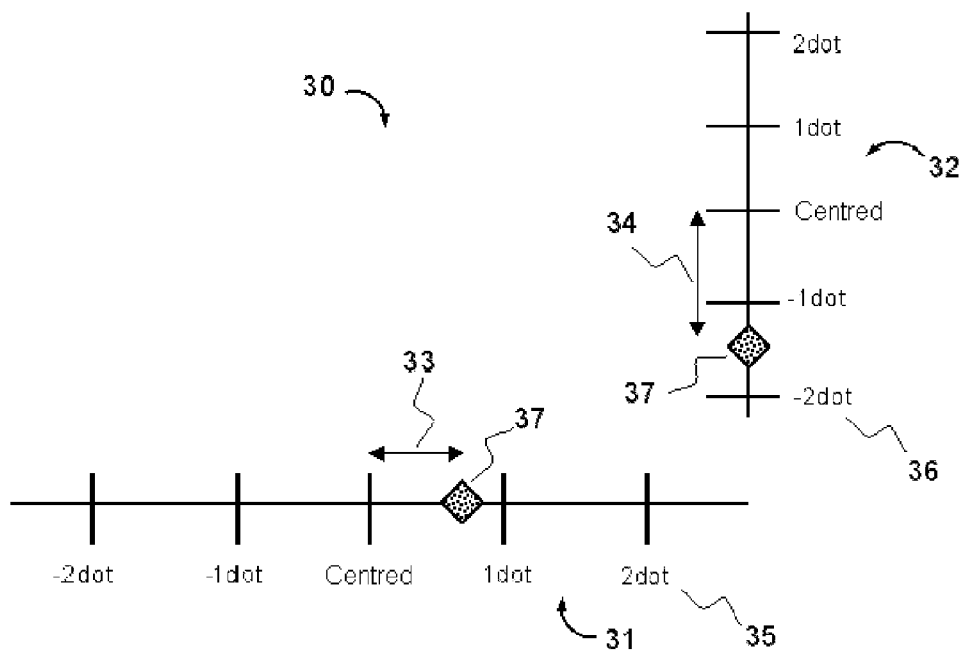
FIG. 4 illustrates means for graphically representing, or monitoring, an angular deviation, laterally and vertically, FIG. 5 schematically represents the navigation of an aircraft during an approach phase on an angular section, and the characteristics useful to the calculation for converting an angular deviation to an equivalent linear deviation.

FIG. 4 illustrates means for graphically representing, or monitoring, an angular deviation, laterally and vertically. On the same principle as for a linear deviation, described in FIG. 3, representing an angular deviation 18 of the aircraft 9 on a lateral deviation axis 31 and a vertical deviation axis 32 is envisaged.

There are a number of methods for establishing an angular deviation, notably according to the transmitting beacon type which embodies the touchdown point. Whatever the method considered, it is possible to determine an angular difference between the estimated position 16 of the aircraft 9 and its desired position 17 on the target trajectory 10.

The angular deviation 18 is represented by a lateral component 33 and a vertical component 34 on two angular scales, lateral 35 and vertical 36. When the aircraft 9 is positioned on the target trajectory 10, it appears centred on each of the scales, lateral 35 and vertical 36; an angular deviation 18 can thus be positive or negative on each of the deviation axes 21 and 22. The angular scales 35 and 36 comprise graduations, commonly referred to as "dots", corresponding to a predetermined angle value; this predetermined value generally being dependent on the distance separating the aircraft 9 from the landing runway 11. FIG. 4 represents means for graphically representing an angular deviation 18, or angular monitoring 30, making it possible to represent, on the lateral 31 and vertical 32 deviation axes, the lateral angular deviation 33 and the vertical angular deviation 34 of the aircraft 9 by means of a rhomboid 37 symbolizing the aircraft 9, positioned on the angular scales, lateral 35 and vertical 36.

Thus, the navigation assistance method comprises steps for calculating and graphically representing:
- a linear deviation 15, for the aircraft 9 in approach phase towards an arrival airport on a linear section 12; the linear deviation representing the distance separating the estimated position 16 of the aircraft 9 and the desired position 17 on the target trajectory 10; the linear deviation 15 being able to be expressed by a lateral component 23 and a vertical component 24,
- an angular deviation 18, for the aircraft 9 in approach phase towards an arrival airport on an angular section 13; the angular deviation 18 representing the angle formed at the touchdown point 14 situated in proximity to the landing runway threshold 11, between the target trajectory 10 and the straight line D1 joining the touchdown point 14 to the estimated position 16 of the aircraft 9; the angular deviation 18 being able to be expressed by a lateral component 33 and a vertical component 34.

Figure 5:
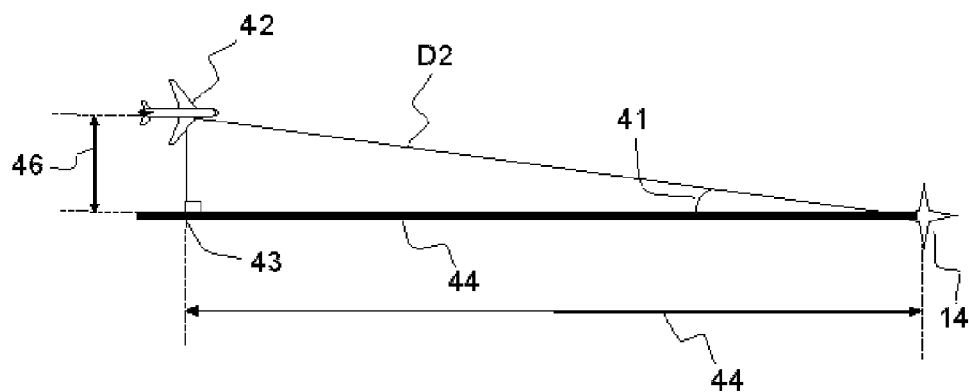

FIG. 5 schematically represents the navigation of an aircraft 9 during an approach phase on an angular section, and the characteristics useful to the calculation for converting an angular deviation into an equivalent linear deviation.

Along the angular section, an angular deviation 41 is defined as the angle formed at the touchdown point 14, between a target trajectory 44 and a straight line D2 joining the touchdown point 14 to an estimated position 42 of the aircraft 9. The orthogonal projection of the estimated position 46 of the aircraft 9 on the target trajectory 44 corresponds to a desired position 43 of the aircraft 9. The distance separating the touchdown point 14 and the desired position is referenced 45. A linear deviation 46 of the aircraft 9 corresponds to the distance separating the estimated position 42 and the desired position 43.

In these conditions, the knowledge of an angular deviation 41, for example established by means of a wireless receiver picking up the signal transmitted by a transmitting beacon, and of the distance 45, for example established by means of the functions of location 1, of construction of the target trajectory 5 and 6, and of guidance 7 of the aircraft, makes it possible to calculate an equivalent linear deviation 46.

According to the invention, the navigation assistance method comprises a step of conversion of the angular deviation 41 into an equivalent linear deviation 46, observing the following mathematical relationship:

$$Dev = D*\tan(Alpha)$$

in which Dev represents the linear deviation 46, D represents the distance 45 and Alpha represents the angular deviation 41.

According to the same principle, it is possible to determine a linear deviation equivalent to the "dot" angle corresponding to a graduation on the angular scale represented on FIG. 4. In other words, it becomes possible to represent, on a linear scale, a projection of an angular deviation. On a linear section, a "dot" graduation corresponds to an "RNP" deviation and the scale remains identical as long as the RNP requirement does not change. On an angular section, the scale changes as a function of the distance 45. The more the aircraft 9 approaches the touchdown point 14, the tighter the scale becomes.

According to the invention, the navigation assistance method comprises a step of conversion of an angular deviation into an equivalent linear deviation, according to a similar principle. Knowing the linear deviation and the distance 45, for example by means of the functions of location 1, of construction of the target trajectory 5 and 6, and of guidance 7 of the aircraft 9, the method determines an equivalent angular deviation by means of the mathematical relationship (i) which has already been described. This conversion makes it possible, for example, to project a linear deviation onto a linear go-around section equivalent to a determined angular deviation on the final angular section. It also becomes possible to force an angular guidance before the capture of the signal transmitted by the transmitting beacon.

Thus, the method comprises a step of conversion of an angular deviation 41 into an equivalent linear deviation 46, and, conversely, the conversion of a linear deviation 46 into an equivalent angular deviation 41, observing the following mathematical relationship:

$$Dev = D*\tan(Alpha)$$

in which Dev represents the equivalent linear deviation 46, D represents a distance 45 between the touchdown point 14 and the desired position 43 on the target trajectory 10, and Alpha represents the angular deviation 41.

Advantageously, the navigation assistance method makes it possible to monitor, all along the approach phase, a navigation performance, by means of a deviation that can be represented independently on a linear or angular scale. As an example, it is possible to ensure the monitoring of performance linearly, during the last linear section and during the transition to the final angular section, by means of an equivalent linear deviation determined by calculation on the basis of an angular deviation. In a second stage, the crew can decide to switch over to a display of the deviations angularly, after the necessary manoeuvres on entering the angular section have been carried out. According to the same principle, it is possible, in the case of an interrupted approach, to project a navigation performance onto the linear go-around section, by calculation on the basis of the measured angular deviation.

Figure 6:
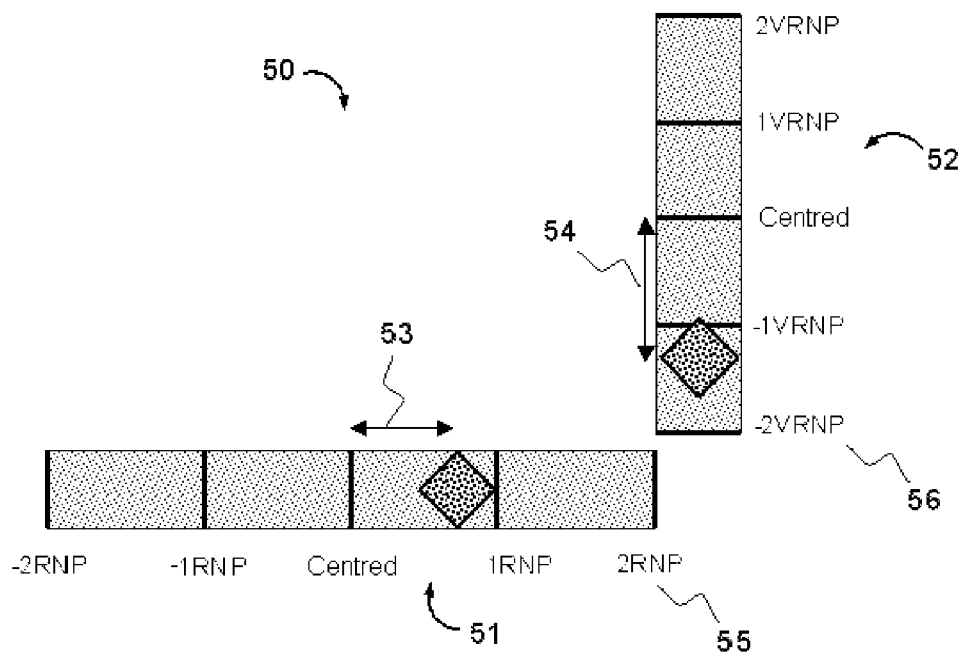
FIG. 6 illustrates means for graphically representing the linear or angular deviations, called unified monitoring, FIG. 7 schematically represents the navigation of an aircraft during an approach phase containing curvilinear portions, FIG. 8 schematically represents the principle of calculation of an anticipated deviation and of an associated error, represented for an aircraft in the approach phase on an angular section.

FIG. 6 illustrates graphic representation means according to the invention, called unified monitoring 50, making it possible to display a deviation of the aircraft 9 all along an approach phase. The unified monitoring 50 comprises a lateral deviation axis 51 and a vertical deviation axis 52. A deviation of the aircraft 9 is represented by means of a lateral deviation 53 positioned on the lateral deviation axis 51 provided with a graduation scale 55, and of a vertical deviation 54 positioned on the vertical deviation axis 52 provided with a graduation scale 56.

Advantageously, it is possible to choose, for each of the deviation axes 51 and 52, between a linear graduation scale (as represented in FIG. 6) and an angular graduation scale (according to a graphic representation similar to that of FIG. 4 which has already been described). It will also be possible to consider representing a combined scale, including, for each deviation axis, a linear scale and an angular scale. When a linear scale is selected, for example for the lateral deviation axis 51, it is possible to represent on this axis an angular deviation of the aircraft 9 (represented by the rhomboid in FIG. 6), previously converted into an equivalent linear deviation by the calculation means described previously. It is also possible to select a different scale for each of the two deviation axes 51 and 52; for example, the scale 55 of the lateral deviation axis 51 being linear and the scale 56 of the deviation axis 52 angular.

Advantageously, the unified monitoring 50 comprises, for each of the deviation axes, lateral 51 and vertical 52, means for selecting the scales 55 and 56, linear, angular or combined. The selection can be made manually for each of the deviation axes 51 and 52 by the crew, or can be performed automatically by means of a number of criteria dependent on the flight conditions.

In a preferred implementation of the invention, a first criterion provides for switching over from a linear display to an angular display on the two axes, as soon as one of the two axes switches over to angular mode. A second criterion provides for switching over from a linear display to an angular display when the distance separating the aircraft 9 from the landing runway 11 is below a predetermined threshold. A third criterion provides for switching over from a linear display to an angular display as soon as the aircraft 9 receives a signal from the transmitting beacon.

Advantageously, the graduations of the linear and angular scales of the lateral 51 and vertical 52 deviation axes correspond to a required navigation performance level. The graduations can be adapted to variable requirement levels during the flight of the aircraft 9, according to the same principle as described in FIG. 3 for the monitoring of navigation performance linearly. Thus, it is possible to select, for example for the linear scales, graduations conforming to the current standardization, in particular the RNP and V-RNP scales. It becomes possible to ensure a monitoring of the navigation performance, for example of "RNP 0.3" type, all along an approach phase, on a linear section and on the final angular section.

The navigation assistance method according to the invention is particularly advantageous because it makes it possible to monitor the navigation performance all along an approach phase, with no discontinuity between the different sections covered, both linear and angular.

Figure 7:
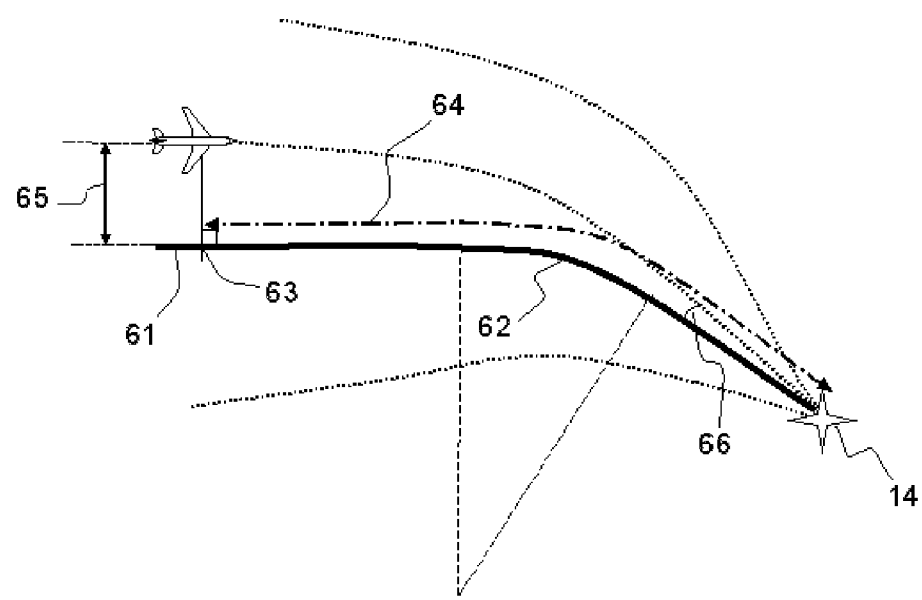

FIG. 7 schematically represents the navigation of an aircraft 9 during an approach phase containing a curvilinear trajectory.

A target trajectory 61 comprises a curvilinear portion 62 between the touchdown point 14 and the desired position 63 of the aircraft 9 on the target trajectory 61. The desired position 63 corresponds to the orthogonal projection of the aircraft 9 on the target trajectory 61. The length of the curvilinear segment between the touchdown point 14 and the desired position 63 is referenced 64. The linear deviation is referenced 65.

It is possible to calculate, at each instant along this curvilinear trajectory, the distance 64 as well as the linear deviation 65, for example by means of the functions of location 1, of construction of the target trajectory 5 and 6, and of guidance 7 of the aircraft 9. From this calculation of the distance 64 and of the linear deviation 65, it is possible to determine and display an equivalent angular deviation 66, based on the distance 64 and the linear deviation 65. Thus, the unified monitoring 50 can be applied in the case of an approach containing a curvilinear portion, and it becomes possible to carry out an angular approach and a monitoring of the navigation performance all along the approach phase, on longilinear portions and on curvilinear portions.

Finally, it will also be possible to envisage integrating conditions for abandoning the unified monitoring 50 in the case where the trajectory has curvilinear portions with a radius of curvature below a predetermined threshold value; the accuracy of the linear projection becoming, in these conditions, too low.

Figure 8:
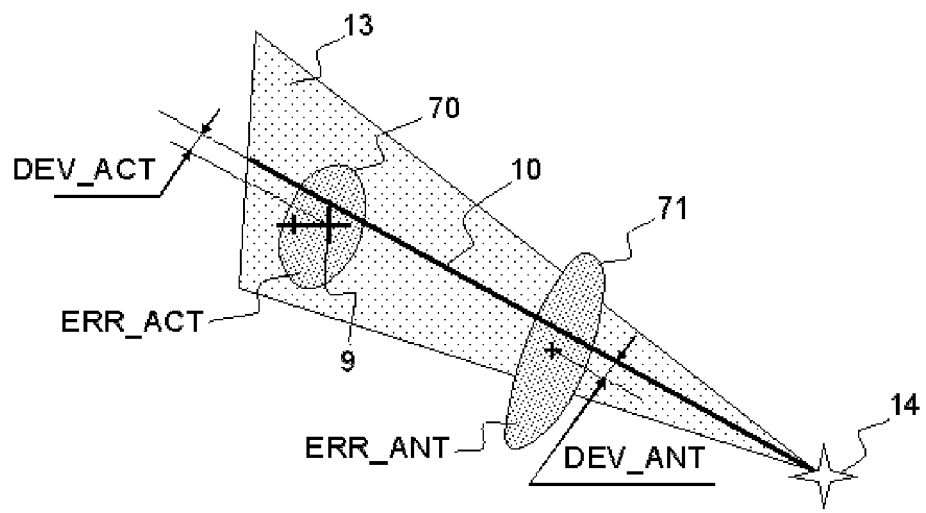

FIG. 8 schematically represents the principle of calculation of an anticipated deviation DEV_ANT and of an associated statistical error distribution ERR_ANT, represented for an aircraft 9 in approach phase on an angular section 13 converging towards a touchdown point 14.

In the figure, the aircraft 9 exhibits a deviation DEV_ACT relative to a target trajectory 10. The deviation DEV_ACT can be expressed and represented independently angularly or linearly, by means of the functions described previously.

According to the invention, the navigation assistance method comprises steps of calculating a statistical error distribution ERR_ACT associated with the deviation DEV_ACT. In a preferred implementation of the invention, the statistical error distribution ERR_ACT is the sum of a plurality of error sources, each being taken into account in the calculation by a statistical distribution. The statistical error distribution ERR_ACT for example takes into account the errors linked to the functions of location 1, of construction of the target trajectory 5 and 6, or of guidance 7 of the aircraft 9. Thus, the method determines, at each instant, the deviation DEV_ACT and a statistical error distribution ERR_ACT.

Thus, it is possible to determine, for a predetermined accuracy requirement EXI_PREC, a range of the deviations 70 that observes this accuracy requirement. According to the same principle, it is possible to determine, for a predetermined deviation range EXI_DEV, for example corresponding to a given required navigation performance, the probability of presence of the aircraft 9 in the deviation range EXI_DEV.

According to the invention, the navigation assistance method comprises a step of calculating an anticipated deviation DEV_ANT, expressed linearly or angularly, projected at a time DT, characteristic of a reaction time of the aircraft 9, and a statistical error distribution ERR_ANT associated with this anticipated deviation DEV_ANT.

Advantageously, the navigation assistance method comprises a step of calculating the time DT, based on:
    a time DTH, representative of the human reaction time, calculated by means of a plurality of parameters that can vary during the flight, comprising at least a decision-taking time, a time of engagement and of verification of a guidance mode, a time of modification of the choices of the location means or a time making it possible to place the aeroplane in a more stable aerodynamic configuration, a time DTA, representative of the manoeuvrability of the craft, calculated by means of a plurality of parameters that can vary during the flight, comprising at least one parameter representative of the speed of the aircraft, one parameter representative of the current manoeuvre for rejoining the target trajectory or one parameter representative of the other current navigation assistance methods.

In a preferred implementation of the invention, the time DT is equal to the longest time between the human reaction time DTH and the time representative of the manoeuvrability of the craft DTA. In an alternative implementation, the time DT will be determined by means of a sum of the times DTH and DTA, or even by means of a quadratic sum of the times DTH and DTA.

According to the invention, the navigation assistance method determines, for this time DT and by means of the known trajectory calculation functions, in particular the functions 6 and 7, an anticipated deviation DEV_ANT. A number of calculation means can be implemented to determine the statistical error distribution ERR_ANT associated with the anticipated deviation DEV_ANT. In a preferred implementation of the invention, the statistical error distribution ERR_ANT is the sum of a plurality of error sources, each being taken into account in the calculation by a statistical distribution. Advantageously, the error sources taken into account comprise at least the errors linked to the functions of location 1, of construction of the target trajectory 5 and 6 or of guidance 7 of the aircraft 9.

An example of calculation of the statistical error distribution ERR_ANT, based on the expected performance of the functions of location 1, of construction of the target trajectory 5 and 6, and of guidance 7 of the aircraft 9, is described below. In this preferred implementation, for each of the axes (longitudinal, lateral and vertical) the error is determined in the form of a distribution Gaussian. The three error sources are then modelled in the form of:

three vectors of the errors on the estimation of the bias:
EB_loc: 3D vector of the bias of the location functions 1 (longitudinal, lateral and vertical)
EB_traj: 3D vector of the bias of the target trajectory construction functions 5 and 6
EB_guid: 3D vector of the bias of the functions of guidance 7 of the aircraft 9
a matrix of the errors on the estimation of the drifts ED, including crossed terms between axes (three-dimension square matrix)
three standard deviation vectors of the errors:
S_loc: 3D vector of the standard deviation of the errors on the location functions 1
S_traj: 3D vector of the standard deviation of the errors on the target trajectory construction functions 5 and 6
S_guid: 3D vector of the standard deviation of the errors on the guidance functions 7 of the aircraft 9.

The statistical error distribution ERR_ANT expressed as an overall 3D error vector is then determined by a function of the individual errors ERR_ACT, EB_LOC, EB_traj, EB_guid, ED, S_loc, S_traj, S_Guid. It is possible, for example, to use the following relationship:

$$ERR\_ANT = ERR\_ACT + EB\_loc + EB\_traj + EB\_guid + ED*(DT\ DT\ DT)^T + N*(S\_loc + S\_traj + S\_Guid)$$

in which DT is the characteristic time defined previously, the vector $(DT\ DT\ DT)^T$ making it possible to obtain, by multiplication with the ED matrix, the 3D vector representing the errors on the drifts projected at the time DT. N, generally expressed as sigma, represents the expected accuracy on the calculated error.

It is also possible to use a relationship of the type:

$$ERR\_ANT = ERR\_ACT + SQRT(EB\_loc^2 + EB\_traj^2 + EB\_guid^2) + ED*(DT\ DT\ DT)^T + N*(S\_loc + S\_traj + S\_Guid)$$

in which SQRT corresponds to the square root function of the terms between brackets; this last relationship being particularly suited to independent errors. Other mathematical relationships on these variables are also possible according to the invention.

Thus, the method determines, at each instant, the anticipated deviation DEV_ANT and a statistical error distribution ERR_ANT. It is then possible to determine, for a predetermined accuracy requirement EXI_PREC, a range of the deviations 71 that observes this accuracy requirement. According to the same principle, it is possible to determine, for a predetermined deviation range EXI_DEV, for example corresponding to a given required navigation performance, the probability of keeping, with the current trajectory, the aircraft 9 within the deviation range EXI_DEV at the time DT.

Figure 9:
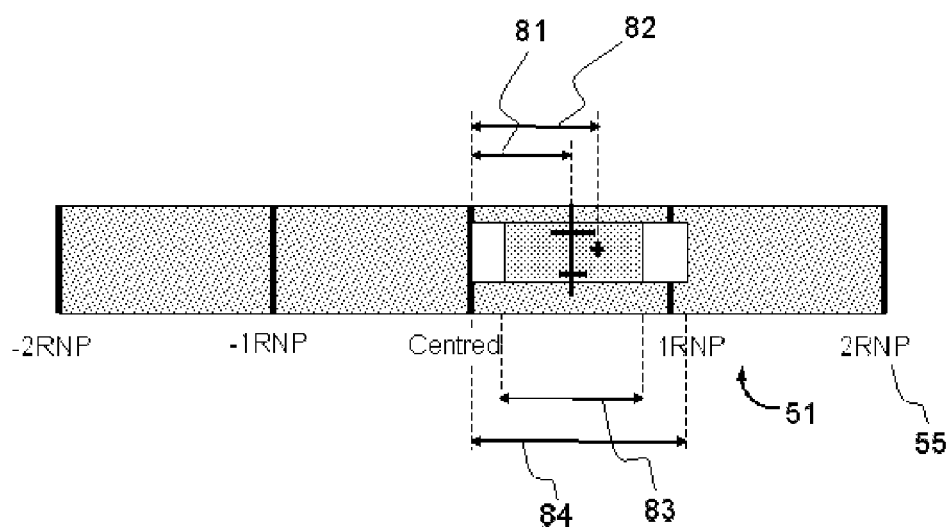
FIG. 9 illustrates means for graphically representing current and anticipated deviations and statistical error distributions which are associated therewith.

FIG. 9 illustrates means for graphically representing the current deviation DEV_ACT and anticipated deviation DEV_ANT, and the statistical error distributions which are associated therewith, respectively ERR_ACT and ERR_ANT.

The deviation DEV_ACT of the aircraft 9 is expressed linearly by a lateral component 81, represented graphically on a lateral deviation axis 51 graduated by means of a linear scale 55, and by a vertical component (not represented). As described previously, the deviation DEV_ACT could also be expressed and represented angularly, by means of the conversion functions described previously.

The anticipated deviation DEV_ANT, projected at the time DT, is expressed by a lateral component 82 represented on the same scale as the current lateral deviation 81.

According to the invention, the navigation assistance method comprises a step of graphic representation of the statistical error distributions, current ERR_ACT and anticipated ERR_ANT. Thus, for each of the deviations 81 and 82, an error interval is determined, respectively 83 and 84, by means of the statistical error distributions ERR_ACT and ERR_ANT and for a predetermined accuracy requirement EXI_PREC.

The calculation and the graphic representation of an anticipated deviation DEV_ANT and of an associated statistical error distribution ERR_ANT are particularly advantageous in as much as this makes it possible to give the crew a capacity to anticipate the trajectories of the aircraft 9. The crew has more time to react and decide on the corrective measures to be applied.

These tools are also particularly suited to the unified monitoring 50 described previously. In practice, it becomes possible, during a transition from a linear section to a final angular section, to maintain navigation performance monitoring all along the transition. It enables the crew to anticipate the trajectory of the aircraft 9, and to evaluate, without discontinuity, the probability of maintaining, during the transition and on the angular section, a navigation performance that conforms to a given requirement, and, if appropriate, to anticipate the necessary manoeuvres of the craft.

Figure 10:
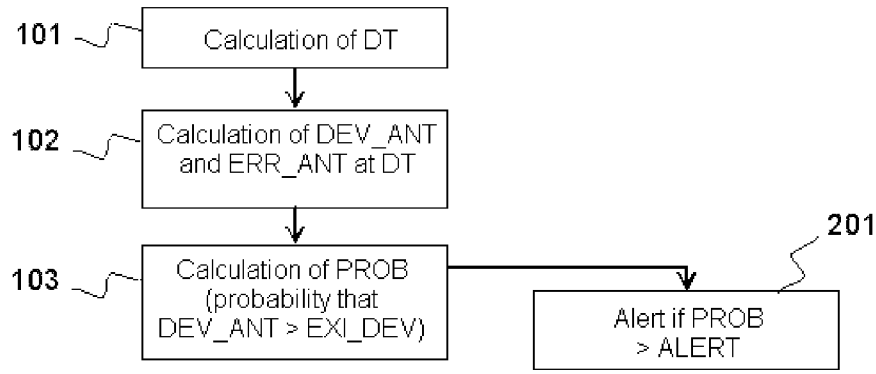
FIG. 10 represents a schematic diagram of the navigation assistance method according to a first embodiment of the invention.

FIG. 10 represents a schematic diagram of the navigation assistance method according to a first embodiment of the invention.

According to this first embodiment, the navigation assistance method comprises the following three calculation steps carried out in succession:

- calculation 101 of the time DT, characteristic of a reaction time of the aircraft 9,
- calculation 102 of an anticipated deviation DEV_ANT for this time DT and of an associated statistical error distribution ERR_ANT,
- calculation 103 of a probability PROB of exceeding a predetermined target deviation EXI_DEV, for example corresponding to a required navigation performance, by means of DEV_ANT and ERR_ANT.

Advantageously, an alert 201 is transmitted to the crew when the probability is above a predetermined ALERT threshold, for example 95%, 99% or 99.99%.

Advantageously, the navigation assistance method as described in FIG. 10 comprises one or more activation conditions, comprising at least one of the following conditions: the remaining distance to be covered to the touchdown point 14 is less than a predetermined threshold distance, the touchdown point 14 is transmitting a signal received by the aircraft 9. Similarly, the method comprises one or more deactivation conditions, so as to interrupt the calculation, for example when the aircraft 9 reaches the landing runway 11.

Thus, the navigation assistance method is activated and deactivated automatically, and a confirmation of its activation and deactivation by the crew can usefully be added.

Figure 11:
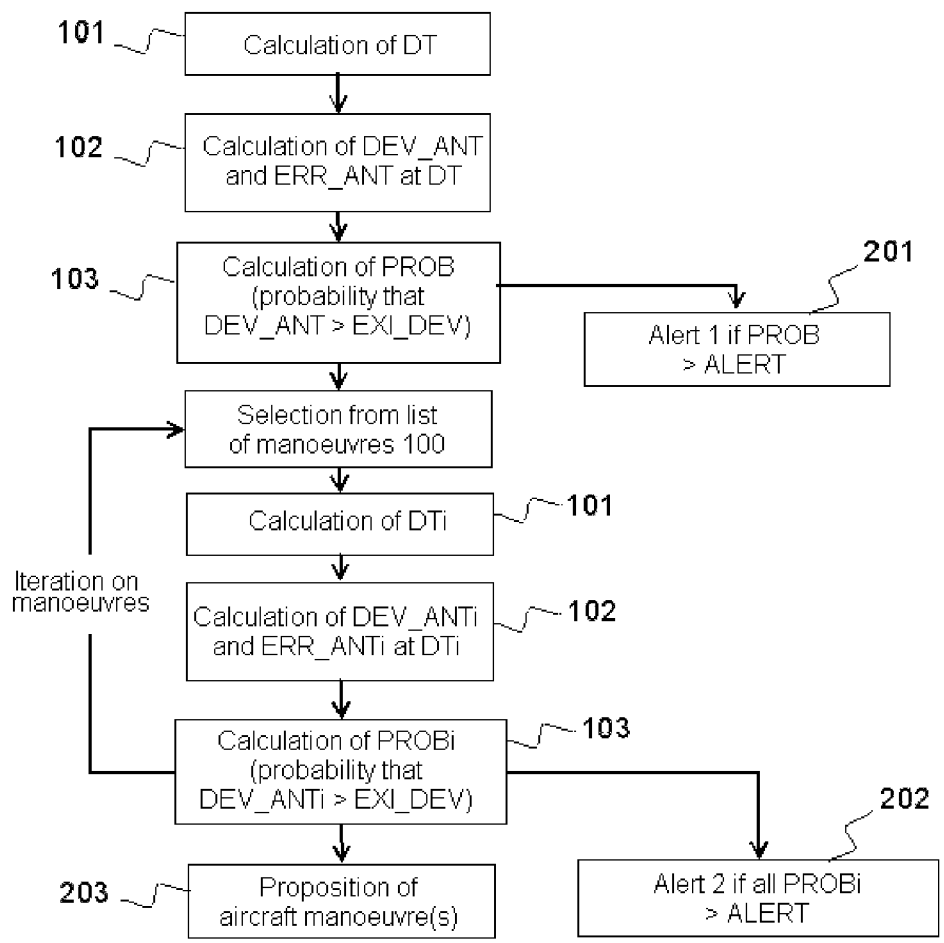
FIG. 11 represents a schematic representation of the navigation assistance method according to a second embodiment of the invention.

FIG. 11 represents a schematic diagram of the navigation assistance method according to a second embodiment of the invention.

According to this second embodiment, the navigation assistance method comprises a list 100 of possible manoeuvres of the aircraft 9, and means making it possible to evaluate the benefit of switching over to a manoeuvre in the list to improve the monitoring of the navigation performance.

The principle of the navigation assistance method can be described as follows:

- in a first phase, the calculations 101, 102 and 103 are carried out in succession to determine a probability PROB of exceeding, at the time DT, a predetermined target deviation EXI_DEV, by means of the anticipated deviation DEV_ANT and of the associated statistical error distribution ERR_ANT, that is to say with the current trajectory of the aircraft 9,
- in a second phase, the calculations 101, 102 and 103 are carried out in succession, iteratively for each of the possible manoeuvres in the list 100, so as to determine, in succession:
  - a time DTi, characteristic of the reaction time of the aircraft 9, assuming that the crew switches over to the manoeuvre concerned,
  - an anticipated deviation DEV_ANTi and a statistical error distribution ERR_ANTi, determined for the time DTi and assuming that the crew switches over to the manoeuvre concerned,
  - a probability PROBi of exceeding, at a time DTi, the predetermined target deviation EXI_DEV, assuming that the crew switches over to the manoeuvre concerned.

From this calculation, different interactions with the crew can be put in place, to enable it to optimize the monitoring of the navigation performance, for example by deciding to switch over to one of the manoeuvres in the list 100.

Thus, a first alert 201 can be transmitted to the crew when the probability PROB determined for the current trajectory is above the predetermined ALERT threshold, for example 95%, 99% or 99.99%. A second alert 202 can be transmitted to the crew when, at the end of the calculation, all the manoeuvres exhibit a probability PROBi above the predetermined ALERT threshold.

Advantageously, the navigation assistance method comprises means 203 for suggesting to the crew to switch over to an alternative manoeuvre of the aircraft 9, which exhibits a probability PROBi less than the probability PROB calculated with the current trajectory.

Advantageously, the means 203 make it possible to suggest to the crew to switch over to an alternative manoeuvre of the aircraft 9 that exhibits a probability PROBi below a predetermined ALERT threshold.

Advantageously, the means 203 comprise means for selecting the manoeuvre proposed to the crew, comprising at least one of the following selection criteria: the first manoeuvre having been the subject of the calculation of probability PROBi below the predetermined ALERT threshold is proposed, the manoeuvre which exhibits the probability PROBi closest to the predetermined ALERT threshold is proposed, the manoeuvre which exhibits the lowest probability PROBi is proposed.

Advantageously, the list of manoeuvres 100 comprises at least the switchover to alternative location functions 1, the switchover to alternative target trajectory construction functions 5 and 6, or the switchover to alternative guidance functions 7, including, for example, the switchover to an automatic piloting mode. The list of manoeuvres 100 can also include the transmission, automatic or on demand from the crew, of specific alert code or of standardized digital messages to other aircraft or to air traffic control at the arrival airport; this transmission being carried out by means of various devices such as, for example, a transponder.

Advantageously, the navigation assistance method as described in FIG. 10 comprises one or more activation conditions, comprising at least one of the following conditions: the remaining distance to be covered to the touchdown point 14 is less than a predetermined threshold distance, the touchdown point 14 is transmitting a signal received by the aircraft 9. Similarly, the method comprises one or more deactivation conditions, so as to interrupt the calculation, for example when the aircraft 9 reaches the landing runway 11.

Thus, the navigation assistance method is activated and deactivated automatically, and a confirmation of its activation and deactivation by the crew can usefully be added.

The invention claimed is:

1. A method for assisting in the navigation of an aircraft navigation, the method comprising:

calculating and displaying a linear deviation, expressed by a lateral component and a vertical component, for an aircraft in an approach phase towards an arrival airport on a first section, called a linear section, the linear deviation representing a distance separating an estimated position of the aircraft and a desired position on a target trajectory;

calculating and displaying an angular deviation, expressed by a lateral component and a vertical component, for the aircraft in the approach phase towards the arrival airport on a second section, called an angular section, the angular deviation representing an angle formed at a touchdown point situated in proximity to a landing runway threshold between the target trajectory and a straight line joining the touchdown point to the estimated position of the aircraft;

selecting between a linear scale and an angular scale for displaying the vertical or lateral component of the linear or angular deviation of the aircraft;

converting the angular deviation into an equivalent linear deviation if the selected scale is the linear scale, or converting the linear deviation into an equivalent angular deviation if the selected scale is the angular scale; and displaying the vertical or lateral component of the equivalent linear deviation or the equivalent angular deviation on the selected linear or angular scale, wherein the method continuously monitors navigation performance, either on the angular or linear scale, independently of a switchover between a linear and an angular navigation.

2. The method according to claim 1, further comprising converting the angular deviation into the equivalent linear deviation or converting the linear deviation into the equivalent angular deviation, based on the following equation:

$$Dev=D*\tan(Alpha)$$

in which Dev represents the equivalent linear deviation, D represents the distance between the touchdown point and the desired position on the target trajectory, and Alpha represents the angular deviation.

3. The method according to claim 1, further comprising displaying, to a crew, a deviation of the aircraft on a lateral deviation axis and a vertical deviation axis, each of the lateral and vertical deviations being represented on a linear scale, angular scale or a mixed scale.

4. The method according to claim 3, wherein the displaying further comprises selecting scales, expressed linearly, angularly or both for each of the lateral and vertical deviation axes, wherein the crew manually selects for each of the axes or the method automatically selects according to flight conditions.

5. The method according to claim 4, wherein the scales, linear and angular, of the lateral and vertical deviation axes comprise a number of graduations, each graduation representing a required navigation performance level, wherein the graduations are adapted to variable requirement levels during the flight of the aircraft.

6. The method according to claim 4, wherein the linear scales of the lateral and vertical deviation axes conform to a current standardization for the linear deviations, the method further comprising maintaining, on an angular final section, a linear representation conforming to the current standardization to optimize the monitoring of the navigation performance throughout an approach phase.

7. The method according to claim 1, further comprising:
calculating a statistical error distribution associated with a deviation of the aircraft, in linear or angular mode, and
calculating and displaying, for a predetermined accuracy requirement, an error interval around the deviation.

8. The method according to claim 1, comprising:
calculating an anticipated deviation of the aircraft, expressed linearly or angularly, projected at a time DT, characteristic of a reaction time of the aircraft, and an anticipated statistical error distribution associated with the anticipated deviation, and
calculating and displaying, for a predetermined accuracy requirement, an error interval around the deviation.

9. The method according to claim 1, wherein, during an approach phase having a target trajectory comprising at least one curvilinear portion, the method further comprises:
calculating a desired position of the aircraft on the target trajectory;
calculating a travel distance along the target trajectory between the desired position of the aircraft and the touchdown point; and
calculating and displaying an equivalent angular deviation, based on a linear deviation and the travel distance, to monitor the angular navigation performance throughout the approach phase, on longilinear portions and curvilinear portions.

* * * * *